United States Patent [19]

Hofmann

[11] 4,060,424

[45] Nov. 29, 1977

[54] LOW TEMPERATURE SETTING REFRACTORY CEMENTS

[75] Inventor: Harriet E. Hofmann, Shrewsbury, Mass.

[73] Assignee: Norton Company, Worcester, Mass.

[21] Appl. No.: 654,882

[22] Filed: Feb. 3, 1976

[51] Int. Cl.$^2$ .................. C04B 35/10; C04B 35/56; C04B 35/18; C04B 35/04

[52] U.S. Cl. .................. 106/55; 106/44; 106/58; 106/62; 106/65

[58] Field of Search .................. 106/44, 62, 85, 65, 106/55, 58

[56] References Cited

U.S. PATENT DOCUMENTS

| | | | |
|---|---|---|---|
| 3,019,116 | 1/1962 | Doucette | 106/48 |
| 3,190,769 | 6/1965 | Vasilos | 106/48 |
| 3,257,217 | 6/1966 | Van Dreser et al. | 106/62 |
| 3,361,583 | 1/1968 | Elarde et al. | 106/44 |
| 3,509,072 | 4/1970 | Barrington et al. | 106/44 |
| 3,753,744 | 8/1973 | Komaru et al. | 106/44 |

*Primary Examiner*—Winston A. Douglas
*Assistant Examiner*—Mark Bell
*Attorney, Agent, or Firm*—Arthur A. Loiselle, Jr.

[57] ABSTRACT

Refractory materials with high sintering temperatures are made suitable for use as low temperature setting dry vibration cements, ramming cements, gunning cements, and the like by incorporation therein of up to 4% boric acid and a low temperature softening glass or frit. The lower temperature softening frit is finely ground and uniformly mixed with a refractory grain or aggregate. When the mixture is subjected to a temperature as low as 350° C, the frit softens and bonds the refractory grain into a monolithic structure which retains its integrity up to and through the elevated temperatures at which the refractory grains sinter and other high-temperature ceramic bonds form.

1 Claim, No Drawings

LOW TEMPERATURE SETTING REFRACTORY CEMENTS

BACKGROUND OF THE INVENTION

The invention relates to refractory cements. In particular, the invention is concerned with powdered or granular refractory compositions suitable for use as ramming, vibratory or gunning cements.

The basic metal fabrication and processing industry is very dependent on the type and quality of refractory linings available for the furnacing equipment utilized by that industry. Whether it's steel production employing one of the variations of the oxygen steel making processes, cupolas used in foundries, or induction furnaces, refractory inner linings are critical. These linings, at a minimum, must be stable at the high temperatures employed, physically strong enough to resist erosion from the turbulence in the melt, and chemically resistant so as not to be decomposed by the highly reactive mix of the melt. The inner linings can be constructed of mortared refractory brick but obviously the preferred construction would be a monolithic liner and one that can be patched or repaired in place without a complete shut-down of the furnace, or at least without any prolonged shut-down.

The prior art is replete with cement compositions, which fall generally into either wet or dry consistencies depending on how the cement is to be used. Cements are also separable into two additional categories viz. heat bonded and chemcially bonded. The selection of wet or dry is based primarily on how the cement is to be applied or utilized. If the cement is to be used as a vibratory cement, then the powdered cement mixture is dry. If on the other hand the mix is to be used wet such as in wet ramming or gunning operations, the dry cement ingredients are admixed with a predetermined quantity of liquid, usually water, to give the desired consistency. With respect to chemically bonded (cold set) versus heat bonded cements, the latter is generally selected where the physical conditions of the furnacing are such that the cement mix can be put in place and fired at a temperature in excess of 1000° C; these result in highly refractory monolithic structures. In some cases, however, cold setting cements such as Portland or gypsum cements, soluble alkali silicate or phosphate bonded cements, or sulfate or chloride bonded cements are used; these develop a substantial amount of strength at room temperature.

A low temperature setting phosphate or phoshoric acid cement is described by Hansen et al in U.S. Pat. No. 2,852,401 which is suitable for wet cement applications. The cement is made up of a refractory aggregate that is inert in the mixture at room temperature, a minor amount of an aluminous material which is reactive with phosphoric acid at room temperature, and phosphoric acid e.g. a mixture of 5% bauxite, 87% tabular alumina, and 8% of a 75% phosphoric acid solution. The mix may be used immediately or dried at about 52° C for future use with the addition to the thus heated mix, of about 1% water.

Cold setting bonds of the alkali silicate types are described in Rusoff et al U.S. Pat. No. 3,193,402 and Downs U.S. Pat. No. 2,429,872. The Downs patent discloses a mortar mix comprised of highly refractory grains some of which are coated with a highly aluminous glass, a cold setting bond such as sodium silicate, a small amount of an alkali fluoride, and a borate glass with a softening temperature of around 800° C. Rusoff et al teaches a gunning cement composed of a dead burned refractory aggragate, an alkali silicate bonding agent, and particles of a pitch (e.g. coal tar pitch) which has a softening point high enough so that it does not soften prior to application of the cement mix and which decomposes under heat leaving a carbonaceous residue, and a clay type plasticizing component such as hectorite, bentonite, ball clay or the like.

Griggs et al U.S. Pat. No. 3,086,876 is a refractory patching cement that sets rapidly and exothermically thus developing substantial strength in a short period of time, avoiding lengthy furnace shut down periods. The patching compound is a mixture of aluminum, magnetite, a fluxing halide like sodium chloride or fluoride, and a refractory grain such as calcined dolomite. Silicon may be incorporated as an optional addition depending upon the furnacing operation involved. The mixture ignites and undergoes an exothermic reaction at about 1093° C. to form a highly refractory and homogeneous patch.

Burrows in U.S. Pat. No. 3,793,040 discloses a refractory mix suitable for in-place-firing to produce furnace linings. The mix consists of a size graded refractory oxide grain, with up to 85% by volume of said grain having a coating of glass thereon. The glass is a high temperature softening glass, requiring a heat treatment of at least 1300° C to facilitate coating of the glass on the refractory aggregate. The glass is present in an amount of from 2 to 15% by volume of the total composition.

All of the prior art cements suffer to a greater or lesser extent, from one or more disadvantges such as: the requirement of very high temperatures to set the cement; a period in its thermal history, prior to the initiation of high temperature ceramic bond formation, where the structure formed is mechanically weak; and, the lack of versatility which prevents the use of any single prior art cement as a dry vibration cement, ramming cement, and gunning cement.

SUMMARY OF THE INVENTION

In its broadest sense the invention is a refractory cement useful as a ramming, gunning, and especially as a vibration cement. The raw batch cement mix is made up of 95 to 99.5% by weight of a refractory aggregate or grain, and 0.5 to 5% by weight of a powdered bond which is a mixture of inorganic compounds which has been previously fired to form a glass, and which has a softening termperature betwen 350°and 800° C. The low temperature softening characteristics of the bond results in a raw batch refractory cement mix that will set at about the softening temperature or range of the bond i.e. the cement will bond the aggregate at this low temperature and retain the bonding all the way through subsequent heating to temperatures above 1000° C where the more conventional ceramic bonding takes place.

The advantage of the present low temperature maturing cements over prior art cements is most conspicuous when applied to dry vibration cements. Typical methods for making monolithic articles or structures, such as furnace liners, from dry vibration cements, involve packing of the dry cement composition in a form or mold which may be made of wood, followed by vibration to compact the dry powder. The mold is then burned away. Conventional high temperature setting cements do not result in a monolith of optimum strength when utilized in such an operation.

The advantages of the instant invention are also apparent when considered for those metal melting operations where the melting point of the metal is below the temperature of the initiation of ceramic bonding (900°–1000° C). With prior art cements the furnace liner would have to be fired at a temperature above 1000° C in a separate firing step, to set the cement. Normally, it is desirable to place the cement and set it by an initial metal melt. Similarly, in those applications where limited torching of a form must be used, prior art cements are difficult to set sufficiently because of the high temperature required for ceramic type bonding to take place.

tures that are within the scope of the present invention. It would be impractical to list all of the operable quantitative and qualitative compositions. Many such compositions are commercially available as frits. All commercial frits however are not operable because they have softening or melting temperatures in excess of 800° C. The following table lists frits available from the Pemco Company of Baltimore, Maryland. Frits are mixtures of inorganic compounds, predominantly oxides, which have been blended and fused to form a glass, and then finely pulverized. They are used as glazes and enamels; they have also been suggested as additives, in minor quantities to vitrified grinding wheel bonds, as a flux.

TABLE 1

| | | | | | Glaze Frit Compositions - Weight % | | | | | | | | | |
|---|---|---|---|---|---|---|---|---|---|---|---|---|---|---|
| $CaF_2$ | $K_2O$ | $Na_2O$ | $CaO$ | $MgO$ | $BaO$ | $ZnO$ | $PbO$ | $Al_2O_3$ | $B_2O_3$ | $SiO_2$ | $ZrO_2$ | $TiO_2$ | $F$ | °C Melting Range |
| | | | | | | 5.4 | 72.2 | | 9.0 | 13.4 | | | | 504–515 |
| | | 3.6 | 4.5 | | | | 30.5 | 3.4 | 12.6 | 43.0 | 2.4 | | | 732–793 |
| | | 6.4 | | | | | 59.2 | | 14.4 | 20.0 | | | | 538–566 |
| | | | | | | | 88.1 | | | 11.9 | | | | 704–727 |
| | | | | | | | 43.2 | | 21.9 | 34.9 | | | | 793–816 |
| | | | | | | | 83.0 | | 10.0 | 7.0 | | | | 449–477 |
| | 5.4 | 14.7 | 0.5 | | | 0.7 | | 12.1 | 16.9 | 49.7 | | | 1.8 | 716–771 |
| | | 10.4 | 20.0 | | | | | | 23.3 | 46.3 | | | | 760–804 |
| 4.0 | 0.4 | 4.8 | 6.0 | | 8.0 | 16.0 | | 1.0 | 10.0 | 39.8 | 10.0 | | | 704 14 771 |
| | 4.1 | 2.8 | 3.3 | | | | 30.8 | | 6.1 | 43.9 | | 9.0 | 1.3 | 732 14 788 |
| | | 10.4 | | 0.3 | | | 43.1 | 4.0 | 5.9 | 36.3 | | | | 749–822 |
| | | 2.2 | 5.4 | | | 8.7 | 39.9 | 6.3 | 9.2 | 28.3 | | | | 677–704 |
| | | 2.9 | | | | | 40.8 | | 35.7 | 20.6 | | | | 682–721 |
| | | | | | | | 63.2 | | 19.7 | 17.1 | | | | 516–582 |
| | 1.9 | 1.8 | 5.5 | | | | 28.4 | 3.8 | 13.0 | 40.8 | | 1.2 | 3.6 | 716–771 |

The bond is a powdered borosilicate glass which may contain 5 to 50% by weight of one or more oxides of the alkali and/or alkaline earth metals, and from 0 to 45% by weight of one or more of the inorganic compounds zinc oxide, lead oxide, phosphorous pentoxide, zirconium oxide, titanium oxide, and calcium fluoride. The bond has an average particle size not greater than about 40 microns, with the preferred average particle size being about 10 microns. The novel bond may be used in the mix in conjunction with up to 4% by weight of boric acid, based on the total weight of the mix.

More specifically, the bond is a powdered borosilicate glass with a weight percent composition of 1 to 65% silicon oxide, 5 to 35% boron oxide, 0 to 25% aluminum oxide, 0 to 25% sodium oxide, 0 to 8% potassium oxide, 0 to 15% calcium oxide, 0 to 4% boric acid,, 0 to 10% zinc oxide, 0 to 35% lead oxide, 0 to 45% phosphorous pentoxide, 0 to 15% zirconium oxide, 0 to 10% titanium oxide, and 0 to 20% of an inorganic fluorine compound.

All the conventional refractory grains or aggregates are operable within the context of the invention. Such grains or aggregates include silicon carbide, aluminum oxide, magnesium oxide, mullite, and spinel.

The invention provides dry (or wet) materials with high sintering tempertures but which are suitable for use through and at substantially lower temperatures.

DESCRIPTION OF THE PREFERRED EMBODIMENTS

The essence of the invention is the discovery that certain relatively low melting mixtures of inorganic compounds can be used as permanent low temperature bonds for refractory grain, thus forming new refractory cements especially suitable as dry vibration cements but equally useful as ramming or gunning cements.

There are a very large number of combinations of inorganic compounds that will form low melting mixtures commercially avaiable glasses, it is obvious that one could mix a wide variety of combinations of inorganic compounds, fuse the mixtures, and finely pulverize the fused product to form a low temperature bond for refractory aggregate within the purview of the present invention.

Using a low temperature glass (frit) consisting of, by weight, 48.8% $SiO_2$, 21.8% $B_2O_3$, 11.9% $Al_2O_3$, 10.7% $Na_2O$, 5.1% $K_2O$, and 1.7% $CaO$ which was pulverized to an average particle size of 10 microns, the following alumina based dry vibration cement was prepared having the weight percent composition shown.

| Aluminous Dry Vibration Cement | | |
|---|---|---|
| Material | Size | Wt. |
| Standard Fused $Al_2O_3$ (95% $Al_2O_3$) | 6/16 mesh (1500–6000 μm) | 38 |
| Standard Fused $Al_2O_3$ (95% $Al_2O_3$) | 20F (840 μm and finer) | 25 |
| Fused High Purity $Al_2O_3$ glass coated (11%) | 100F mesh (150 μm and finer) | 20 |
| Kyanite | 200F (70 μm and finer) | 5 |
| SiC | 200F (70 μm and finer) | 5 |
| Alumina Fines | 200F (70 μm and finer) | 5 |
| Boric Acid | Powdered | 1 |
| Glass frit | Powdered | 1 |

The cement was dry vibrated into place as a lining for a copper melting induction furnace. It was used successfully to melt and contain copper.

Utilizing the same low temperature glass described above, a dry vibration cement based on magnesia as the grain or aggregate, was prepared having the following weight percent composition:

| Magnesia Dry Vibration Cement | | |
|---|---|---|
| Material | Size | Wt. % |
| Fused MgO | 6 grit and finer | 69.5 |
| Reactive MgO | Powdered | 5 |
| Fused Al₂O₃ | 20 mesh and finer | 24 |
| Boric Acid | Powdered | 1 |
| Glass frit | Powdered | 0.5 |

As pointed out above, the invention is specifically directed at dry vibration cements but is also applicable to other refractory cement applications such as ramming and gunning cements. The above described cements may also be used as ramming or gunning cements by, for example, the addition of water. Alternatively, a green-binder such as goulac, dextrin or a synthetic organic polymer may be used to impart workability to the cement composition. The amounts of these materials which are added to the cement depends to some degree on the preference of the particular user and on the exact application involved. A general purpose ramming cement is produced when 2-3% by weight of goulac and 2-5% by weight of water is added to one of the above cement compositions.

It is not fully understood why the utilization of a low temperature softening bond for refractory aggregate not only bonds at very low temperatures but also maintains that bonding character throughout the temperature range of use which usually well exceeds 1000° C. Ordinarily one would expect the cement structure, e.g. a furnace lining, to collapse or at least badly distort when the temperature of the cement gets much above the softening temperature of the bond. It is theorized that perhaps there is in fact some reaction taking place between the molten frit or glass bond and the aggregate. There is no experimental evidence to support this theory but it does account for the unexpected fact that the low temperature set cement apparently maintains its strength up to the 1000°–1300° C onset of the well known ceramic bonding which is known to take place in these systems.

What is claimed is:

1. A low temperature setting dry refractory cement raw batch mix comprising from 95 to 99.5% by weight of a refractory grain selected from the group consisting of aluminum oxide, magnesium oxide, silicon carbide, mullite, spinel, and mixtures thereof, and a low temperature setting bond which is a borosilicate glass having an average particle size of approximately 10 microns, said bond being composed, on a weight basis, of 1 to 65% silicon oxide, 5 to 35% boron oxide, 0 to 25% aluminum oxide, 0 to 25% sodium oxide, 0 to 8% potassium oxide, 0 to 15% calcium oxide, 0 to 4% boric acid, 0 to 10% zinc oxide, 0 to 35% lead oxide, 0 to 45% phosphorous pentoxide, 0 to 15% zirconium oxide, 0 to 10% titanium oxide, and 0 to 20% of an inorganic fluorine compound, said bond having a softening range between approximately 350° to 800° C.

* * * * *